United States Patent
Yamanaka

(10) Patent No.: US 8,174,574 B2
(45) Date of Patent: May 8, 2012

(54) IMAGE PICKUP APPARATUS

(75) Inventor: Tomoaki Yamanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 747 days.

(21) Appl. No.: 12/253,524

(22) Filed: Oct. 17, 2008

(65) Prior Publication Data

US 2009/0102920 A1    Apr. 23, 2009

(30) Foreign Application Priority Data

Oct. 18, 2007    (JP) ................. 2007-270831

(51) Int. Cl.
*G03B 13/00* (2006.01)

(52) U.S. Cl. ....................................... 348/143

(58) Field of Classification Search ............... 348/143
See application file for complete search history.

(56) References Cited

U.S. PATENT DOCUMENTS

| | | | | |
|---|---|---|---|---|
| 3,690,235 A | * | 9/1972 | Ainslie et al. | 396/351 |
| 4,405,219 A | * | 9/1983 | Yasuda et al. | 353/37 |
| 5,012,262 A | * | 4/1991 | Mogamiya et al. | 396/62 |
| 5,162,946 A | * | 11/1992 | Yamaguchi | 359/676 |
| 5,241,337 A | * | 8/1993 | Betensky et al. | 396/382 |
| 5,309,190 A | * | 5/1994 | Shinohara et al. | 396/55 |
| 5,561,152 A | * | 10/1996 | Freedman | 514/466 |
| 5,826,114 A | * | 10/1998 | Miyamoto et al. | 396/55 |
| 5,850,310 A | * | 12/1998 | Schweizer | 359/622 |
| 5,959,769 A | * | 9/1999 | Yoneyama | 359/407 |
| 5,976,425 A | * | 11/1999 | Nomura et al. | 264/2.2 |
| 6,064,532 A | * | 5/2000 | Enomoto | 359/694 |
| 6,175,451 B1 | * | 1/2001 | Iriyama et al. | 359/627 |
| 6,449,106 B1 | * | 9/2002 | Spinali | 359/811 |
| 6,466,379 B2 | * | 10/2002 | Nakane | 359/699 |
| 6,628,457 B2 | * | 9/2003 | Ito | 359/368 |
| 6,686,988 B1 | * | 2/2004 | Sugawara | 355/22 |
| 6,715,929 B2 | * | 4/2004 | Watanabe et al. | 385/73 |
| 6,762,824 B2 | * | 7/2004 | Mori | 355/52 |
| 7,085,045 B2 | * | 8/2006 | Hanzawa et al. | 359/376 |
| 7,123,423 B2 | * | 10/2006 | Takahashi et al. | 359/698 |
| 7,248,419 B2 | * | 7/2007 | Takahashi et al. | 359/698 |
| 7,308,012 B2 | * | 12/2007 | Namiwaka et al. | 372/50.1 |
| 7,760,439 B2 | * | 7/2010 | Matsusaka | 359/680 |
| 7,787,192 B2 | * | 8/2010 | Matsui et al. | 359/696 |
| 7,924,409 B2 | * | 4/2011 | Imada | 356/3.14 |

FOREIGN PATENT DOCUMENTS

| | | |
|---|---|---|
| JP | 09-027926 A | 1/1997 |
| JP | 2005-130390 A | 5/2005 |
| JP | 2006-191181 A | 7/2006 |
| JP | 2008-311804 A | 12/2008 |

\* cited by examiner

*Primary Examiner* — David Eng

(74) *Attorney, Agent, or Firm* — Canon U.S.A., Inc., IP Division

(57) ABSTRACT

An optical apparatus includes a zoom lens unit, a pan/tilt unit configured to at least one of pan the zoom lens unit and tilt the zoom lens unit, and a center-shift information storage portion configured to store a shift amount of an optical axis for every zooming position, and has a mechanism configured to correct a shift of the optical axis caused by zooming, by driving the pan/tilt unit by the shift amount of the optical axis stored in the center-shift information storage portion.

4 Claims, 5 Drawing Sheets

IMAGE PICKUP APPARATUS

BACKGROUND OF THE INVENTION

1. Field of the Invention

The present invention relates to a method of correcting misalignment of optical axes caused by zooming in an image pickup apparatus.

In particular, the present invention relates to an image pickup apparatus having at least one of a pan mechanism and a tilt mechanism, for example, an image pickup apparatus capable of correcting a center shift of a captured image generated due to misalignment of optical axes of an image pickup lens system caused by zooming when zooming is optically performed.

2. Description of the Related Art

In recent years, a high power, high image-quality image pickup apparatus has been developed. Ideally, if optical axes of all lenses in a lens system are aligned with each other, a center shift of a screen caused by zooming does not occur. Hence, a center object at a wide-angle end would not be shifted from a center object at a telephoto end. Also, a center shift does not occur at an intermediate position.

However, a center shift may actually occur during zooming due to mechanical variation, such as decentration of lens groups, or a deviation between mounting positions of a lens and an image pickup element.

Ideally, when an object 2 located at the center of a screen 1 is zoomed as shown in FIG. 5A, the object 2 should be located at the center of a screen 3. However, due to the above-mentioned reasons, the object 2 may be shifted from the center of the screen 3 because of zooming as shown in FIG. 5B.

In a monitoring image pickup apparatus and an industrial image pickup apparatus, pan and tilt operations are performed by using a camera platform. Also, in order to capture an image at a desired position in an enlarged manner, a lens having a high-power zoom mechanism may be used. Thus, a center shift of a screen caused by zooming has been a bottleneck in recent years.

To reduce the center shift, for example, processing accuracy of a lens or a member belonging to the lens may be increased, or such a member may be adjusted after assembly. However, either method is troublesome work and increases the manufacturing cost.

In light of this, Japanese Patent Laid-Open No. 9-27926 discloses a method for correcting the center shift, in which an extraction position from the image pickup element is shifted to correct the center shift. Japanese Patent Laid-Open No. 2006-191181 discloses that an optical-path correction optical system for image stabilization is also used for correcting the center shift during zooming.

However, when the center shift is corrected by shifting the extraction position from the image pickup element as disclosed in the Japanese Patent Laid-Open No. 9-27926, an image to be captured utilizes only a part of effective pixels of the image pickup element, and hence, image quality may be deteriorated.

When the correction optical system for image stabilization is also used for correcting the center shift as disclosed in Japanese Patent Laid-Open No. 2006-191181, the image quality is not deteriorated. However, since a part of a vibration angle of the optical system for image stabilization is used for center-shift correction, an image stabilization effect and a center-shift correction effect may not be sufficiently provided.

SUMMARY OF THE INVENTION

The present invention provides an image pickup apparatus capable of correcting a center shift of a screen caused by a zooming operation, by using a pan/tilt unit.

According to an aspect of the present invention, an image pickup apparatus includes a pan/tilt unit configured to drive a lens unit in a pan or tilt direction, the lens unit having a zoom lens for zooming; a position detection unit configured to detect a position of the lens unit; a center-shift information storage portion configured to store center-shift information of a screen; and a center-shift correction portion configured to correct a center shift at a position of the lens unit, by the driving of the pan/tilt unit.

According to another aspect of the present invention, an optical apparatus includes a lens unit having a zoom lens for zooming; a pan/tilt unit configured to at least one of pan the lens unit and tilt the lens unit; a pan/tilt driving control unit configured to control driving of the pan/tilt unit; a position detection unit configured to detect a position of the zoom lens of the lens unit and provide information relating to the position detected; and a storage portion configured to store information relating to a center shift of a captured image resulting from the position of the zoom lens, wherein the pan/tilt driving control unit reads the information relating to the center shift stored in the storage portion and controls the driving of the pan/tilt unit based on both the read information and the information relating to the position of the zoom lens detected by the position detection unit.

According to aspects of the present invention, the center shift caused by the zooming operation can be corrected inexpensively without deterioration in the image quality. Moreover, when a plurality of correction modes are provided, priority may be given to center-shift correction or a pan/tilt operation.

Further features of the present invention will become apparent from the following description of exemplary embodiments with reference to the attached drawings.

DESCRIPTION OF THE EMBODIMENT

An illustrated embodiment of the present invention is described in detail with reference to FIGS. 1 to 4.

Figure 1:
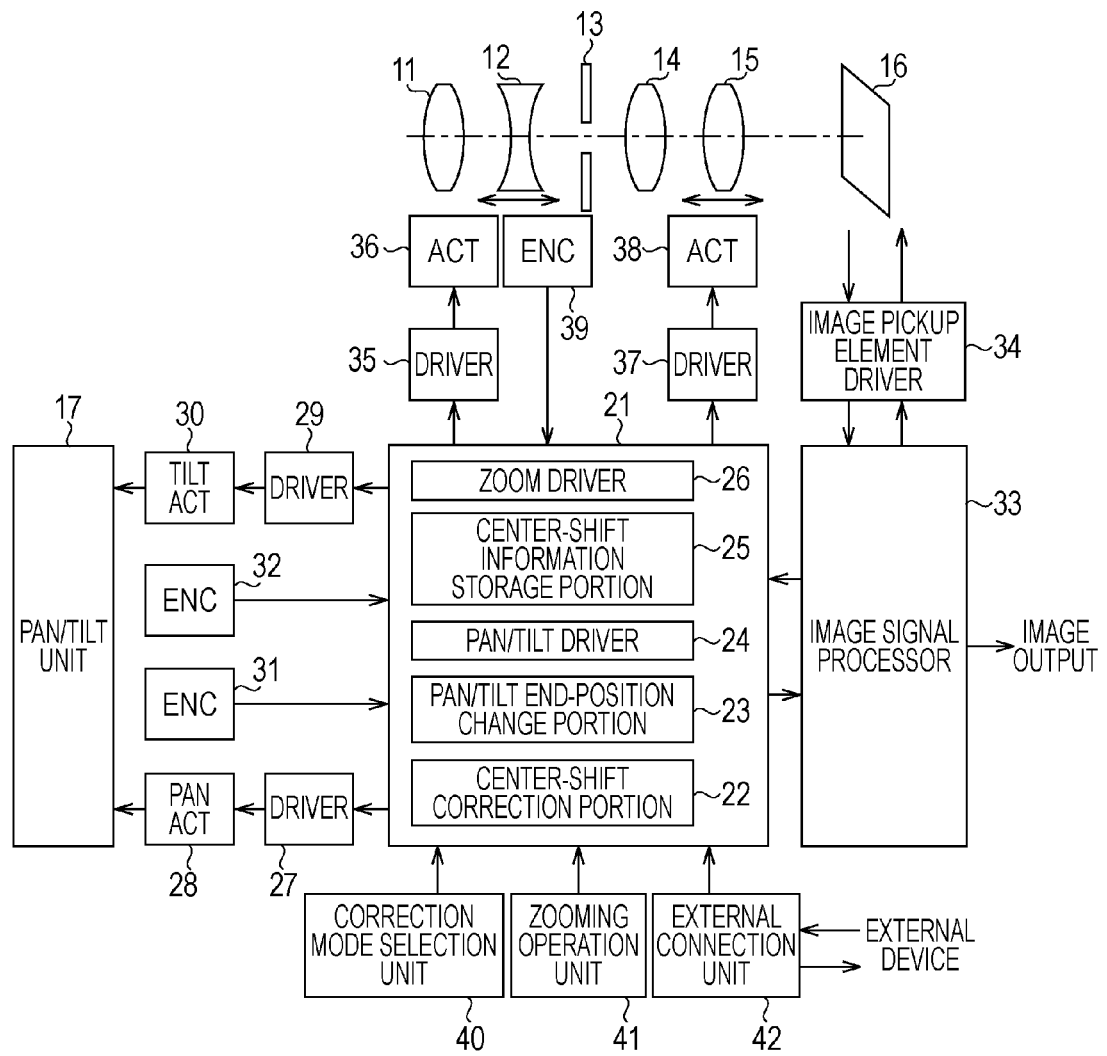
FIG. 1 is a block diagram showing a circuit configuration of an image pickup apparatus according to an embodiment of the present invention.

FIG. 1 is a block diagram showing a circuit configuration of an image pickup apparatus according to an embodiment of the present invention.

A front lens unit 11, a zoom lens unit 12, an aperture unit 13, a fixed lens unit 14, a focus lens unit 15, and an image pickup element 16 are arranged on an optical axis. A lens unit involves these units, and is mounted on a pan/tilt unit 17, such as a camera platform, to perform a pan operation or a tilt operation.

A control CPU 21 includes a center shift correction portion 22, a pan/tilt end-position change portion 23, a pan/tilt driver 24, a center shift information storage portion 25, and a zoom driver 26.

The output of the control CPU 21 is connected with the pan/tilt unit 17 via a driver 27, a pan actuator 28, a driver 29, and a tilt actuator 30. The position of the pan/tilt unit 17 is detected by a pan position encoder 31 and a tilt position encoder 32. The outputs of the pan position encoder 31 and the tilt position encoder 32 are connected with the control CPU 21.

The control CPU 21 is connected with an image signal processor 33. The image signal processor 33 outputs image information, and is connected with the image pickup element 16 via an image pickup element driver 34. The output of the control CPU 21 is operable to drive the zoom lens unit 12 via a driver 35 and an actuator 36, and to drive the focus lens unit 15 via a driver 37 and an actuator 38. Also, the output of a position encoder 39 that detects the position of the zoom lens unit 12 is connected with the control CPU 21.

Further, the outputs of a correction mode selection unit 40, a zooming operation unit 41, and an external connection unit 42 are connected with the control CPU 21. The external connection unit 42 is connected with an external device.

Rays from an object pass through the lens units 11 and 12, the aperture unit 13, and the lens units 14 and 15. Then, the rays form an image on a photodetection surface of the image pickup element 16, which includes a photoelectric conversion element, such as a CCD sensor or a CMOS sensor.

A photoelectrically converted electric charge is accumulated in the image pickup element 16. In response to a signal supplied from the image pickup element driver 34 at a given timing, the electric charge accumulated in the image pickup element 16 is read.

The image pickup element driver 34 contains an analog-to-digital conversion function that converts an analog signal output from the image pickup element 16 into a digital signal. A signal output from the image pickup element 16 via the image pickup element driver 34 is transmitted to the image signal processor 33 as a digital signal. The image signal processor 33 performs various processing, such as predetermined amplification and gamma correction, for the signal output from the image pickup element 16, to generate an image signal. The image signal is output to an external display device such as a liquid crystal display panel.

In response to a driving signal from the zoom driver 26 in the control CPU 21, the actuator 36, such as a DC motor or a pulse motor, is driven via the driver 35. With the actuator 36, the zoom lens unit 12 is moved in an optical-axis direction, to perform a zooming operation.

The position of the zoom lens unit 12 is detected by the position encoder 39. When a pulse motor is used, the position of the zoom lens unit 12 can be detected by counting in the control CPU 21. Hence, the position encoder 39 may be omitted.

In response to a driving signal output from the control CPU 21, the actuator 38, such as a DC motor or a pulse motor, is driven via the driver 37. Accordingly, the focus lens unit 15 is moved, to perform a focusing operation.

Pan/tilt driving of the pan/tilt unit 17 is activated when the pan actuator 28 and the tilt actuator 30 are driven via the drivers 27 and 29 in response to a driving signal output from the pan/tilt driver 24 in the control CPU 21.

The pan and tilt positions through the pan/tilt driving with the pan/tilt unit 17 are detected by the position encoders 31 and 32.

When the actuators 28 and 30 are pulse motors, the positions may be detected by counting in the control CPU 21.

The external connection unit 42 is connected with an external device, such as a personal computer or another image pickup apparatus. Panning, tilting, zooming, and focusing may be controlled by the external device.

The center-shift information storage portion 25 in the control CPU 21 is a rewritable storage element, such as an EEPROM or a flash ROM, and stores in advance data, such as center-shift amounts or correction driving amounts to be driven.

To obtain the center-shift amounts or the correction driving amounts, calculation with design simulation, or measurement during a manufacturing process of the image pickup apparatus is used.

Center-shift information for every zoom lens position may be stored; however, a data amount is increased. Hence, center-shift information for a plurality of zoom lens positions at a predetermined interval may be stored, and when a center shift at a zoom lens position, which is not stored, is to be obtained, the center shift may be approximately calculated by using the stored center-shift information by linear interpolation or the like. Accordingly, the data amount obtained through the design simulation or the measurement during the manufacturing process is reduced, and the calculation or measurement can be easily performed.

The center-shift correction portion 22 uses data relating to the center shift (stored in the center-shift information storage portion 25) to calculate a correction driving amount which is actually necessary for the pan/tilt operation.

Figure 5A:
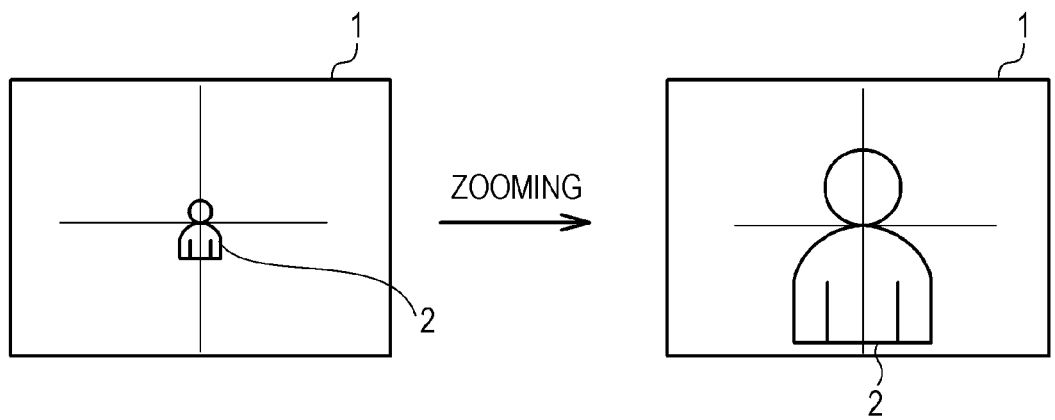
FIGS. 5A and 5B are diagrams for explaining a center-shift during zooming.
Figure 5B:
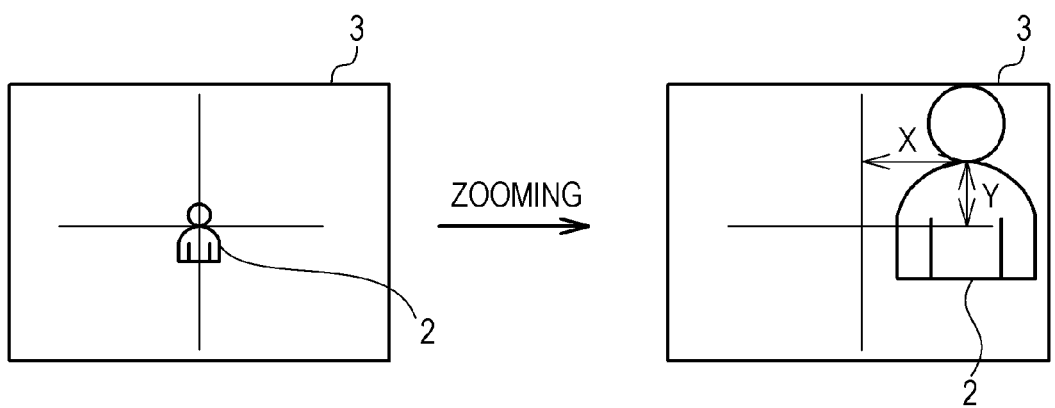

The pan/tilt unit 17 corrects the center shift during zooming in accordance with the correction driving amount calculated by the center-shift correction portion 22. For example, with reference to FIG. 5B, if it is assumed that center-shift amounts without center-shift correction are X and Y, then in accordance with the present embodiment of the present invention, the center shift X is corrected by the pan operation, and the center shift Y is corrected by the tilt operation.

A pan/tilt driving range is sufficiently larger than the center-shift amounts. Hence, both the pan/tilt function and the center-shift correction function with the pan/tilt mechanism may be used.

It is determined whether priority is given to the center-shift correction or to the pan/tilt operation, depending on a correction mode selected by the correction mode selection unit 40. The pan/tilt end-position change portion 23 changes pan/tilt end positions every time when the correction mode is changed.

Although zooming is electrically performed by using the actuator as shown in the block diagram of the circuit configuration in FIG. 1, the configuration of the embodiment may be applied even when zooming is manually performed, as long as the zooming position can be detected.

Zooming is operable not only by an instruction from the zooming operation unit 41, but also by the external device such as a personal computer connected via the external connection unit 42.

In this embodiment, the center-shift information storage portion 25, the pan/tilt end-position change portion 23, the correction mode selection unit 40, the zooming operation unit 41, and the like, which are provided in a camera unit, may be provided at the external device, such as a computer (not shown).

The control CPU 21 may be connected with a network via the external connection unit 42 and may be controlled via the network.

Table 1 shows exemplary operations at pan/tilt ends and exemplary center-shift correction operations in the respective correction modes.

TABLE 1

| | Correction mode | |
|---|---|---|
| | Pan/tilt end | Center-shift correction |
| Center-shift correction priority | Restricted | Correction in entire pan/tilt range |
| Pan/tilt priority | Not restricted | No correction at pan/tilt end |
| No Center-shift correction | Not restricted | No correction |

In the center-shift correction priority mode, a pan/tilt driving range is restricted, whereby an end position is set inside an actual driving range, and then, the center-shift correction is performed. This is because the center-shift correction may not be performed at the pan/tilt end position. The restriction of the pan/tilt driving range may be obtained by the center-shift correction amount.

In the pan/tilt priority mode, the pan/tilt driving range is not restricted. However, the alignment correction is not performed at the pan/tilt end. In the center-shift no-correction mode, the pan/tilt driving range is not restricted, and the center-shift correction is not performed in the entire pan/tilt range.

Since the respective correction modes are provided, a priority operation can be selected. Hence, an image pickup apparatus is provided, which can be customized in accordance with a demand of a user or an installation location.

Figure 2:
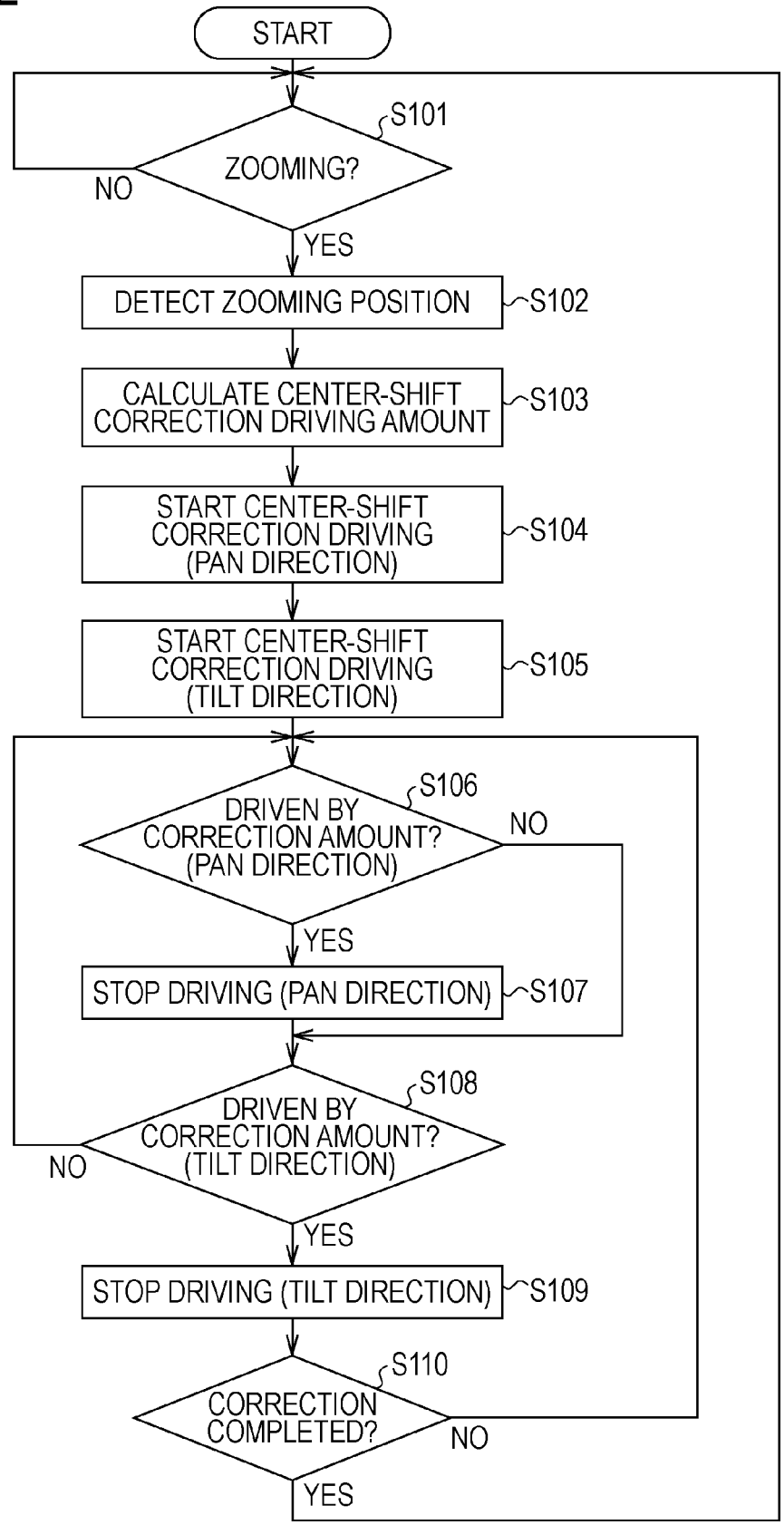
FIG. 2 is a flowchart showing an operation according to an embodiment of the present invention.

FIG. 2 is a flowchart showing the center-shift correction operation during the zooming operation as described above.

(Step S101) It is determined whether the zooming operation is being performed or not by the output of the zooming operation unit 41. When the zooming operation is not performed, subsequent processing is suspended. When the zooming operation is performed, the procedure goes to subsequent step S102 for center-shift correction. Determination of whether the zooming operation is performed or not may be made by an interruption function of the control CPU 21. Zooming does not have to be operated by the zooming operation unit 41, and may be operated in response to a signal from the external device connected with the external connection unit 42.

(Step S102) The zooming position is detected. When the actuator 36 that drives the zoom lens unit 12 is a DC motor or the like, the zooming position has to be detected by the position encoder 39. When the actuator 36 is a pulse motor or the like, the position obtained by counting in the control CPU 21 may be used as the zooming position.

(Step S103) The previously stored center-shift correction information is read from the center-shift information storage portion 25, and the correction driving amount for the center-shift correction is calculated. The center-shift correction information may be an optical center-shift amount or merely a correction driving amount. The center-shift correction information is obtained through the design simulation or the measurement during the manufacturing process.

(Step S104) To perform the center-shift correction, the pan/tilt driver 24 firstly starts driving of the pan/tilt unit 17 in a pan direction via the driver 27 and the pan actuator 28.

(Step S105) Then, to perform the center-shift correction, driving of the pan/tilt unit 17 is started in a tilt direction via the driver 29 and the tilt actuator 30. While the driving is started in the pan direction first in this embodiment, the driving may be started in the tilt direction first, or simultaneously in the pan and tilt directions.

(Step S106) The pan position encoder 31 determines whether the driving in the pan direction by a center-shift correction driving amount is completed or not. When the driving amount is not sufficient, the driving in the pan direction is continued. When the driving is completed by the desired driving amount, the process goes to step S107.

(Step S107) The driving in the pan direction is stopped.

(Step S108) The tilt position encoder 32 determines whether the driving in the tilt direction by a center-shift correction driving amount is completed or not. When the driving amount is not sufficient, the driving in the tilt direction is continued. When the driving is completed by the desired driving amount, the process goes to step S109.

(Step S109) The driving in the tilt direction is stopped.

(Step S110) It is determined whether the driving for correction in both the pan and tilt directions is completed or not. When the correction driving in at least one of the pan direction and the tilt direction is not completed, the process returns to step S106. When the correction driving is completed, the processing from step S101 is performed again.

If the center-shift correction is performed after the zooming operation is completed, a field angle is rapidly changed. As a result, a captured image may be suddenly moved, or it may be difficult to perform zooming into a desired screen.

Hence, it is desirable that the above-described processing is continuously performed during the zooming operation.

Figure 3:
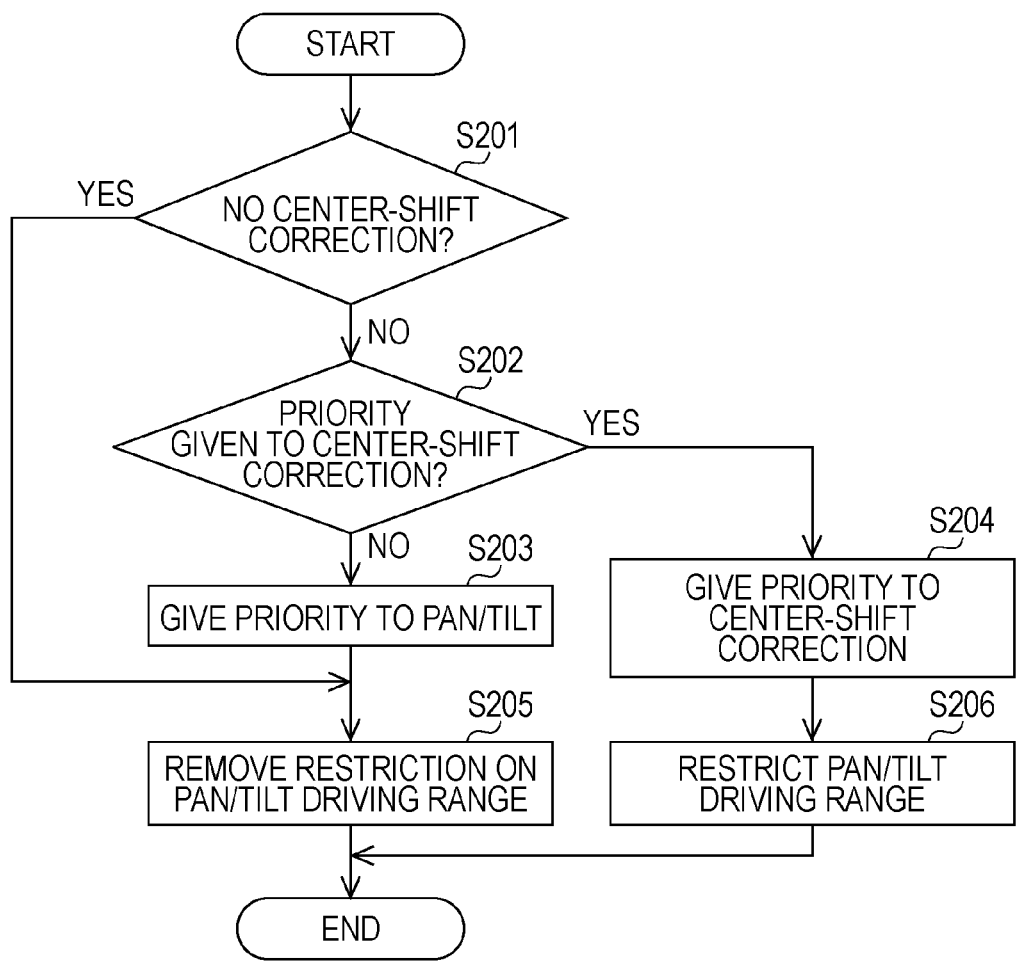
FIG. 3 is a flowchart showing an operation according to an embodiment of the present invention.

FIG. 3 is a flowchart showing setting of the correction mode and restriction of the pan/tilt driving range in accordance with the setting.

(Step S201) It is determined whether the center-shift correction with the center-shift correction portion 22 is validated or invalidated. When the center-shift correction is not to be performed, the process goes to step S205. When the center-shift correction is to be performed, the process goes to subsequent step S202.

(Step S202) The correction mode selection unit 40 determines whether the selected mode is the center-shift correction priority mode, or the pan/tilt priority mode. When priority is given to the center-shift correction, the process goes to step S204. When priority is given to the pan/tilt driving, the process goes to step S203.

(Step S203) The pan/tilt priority mode is set.

(Step S204) The center-shift correction priority mode is set.

(Step S205) Since the center-shift correction is not performed at the pan/tilt end, the restriction on the pan/tilt driving range is removed. Accordingly, the pan/tilt driving is available in the entire movable range in accordance with a pan/tilt driving instruction.

(Step S206) The pan/tilt driving range is restricted. The moving amount to be restricted may be a maximum value of the center-shift correction amount in the entire zooming range. The pan/tilt end-position change portion 23 sets a restricted end position as a new pan/tilt movable end.

Figure 4:
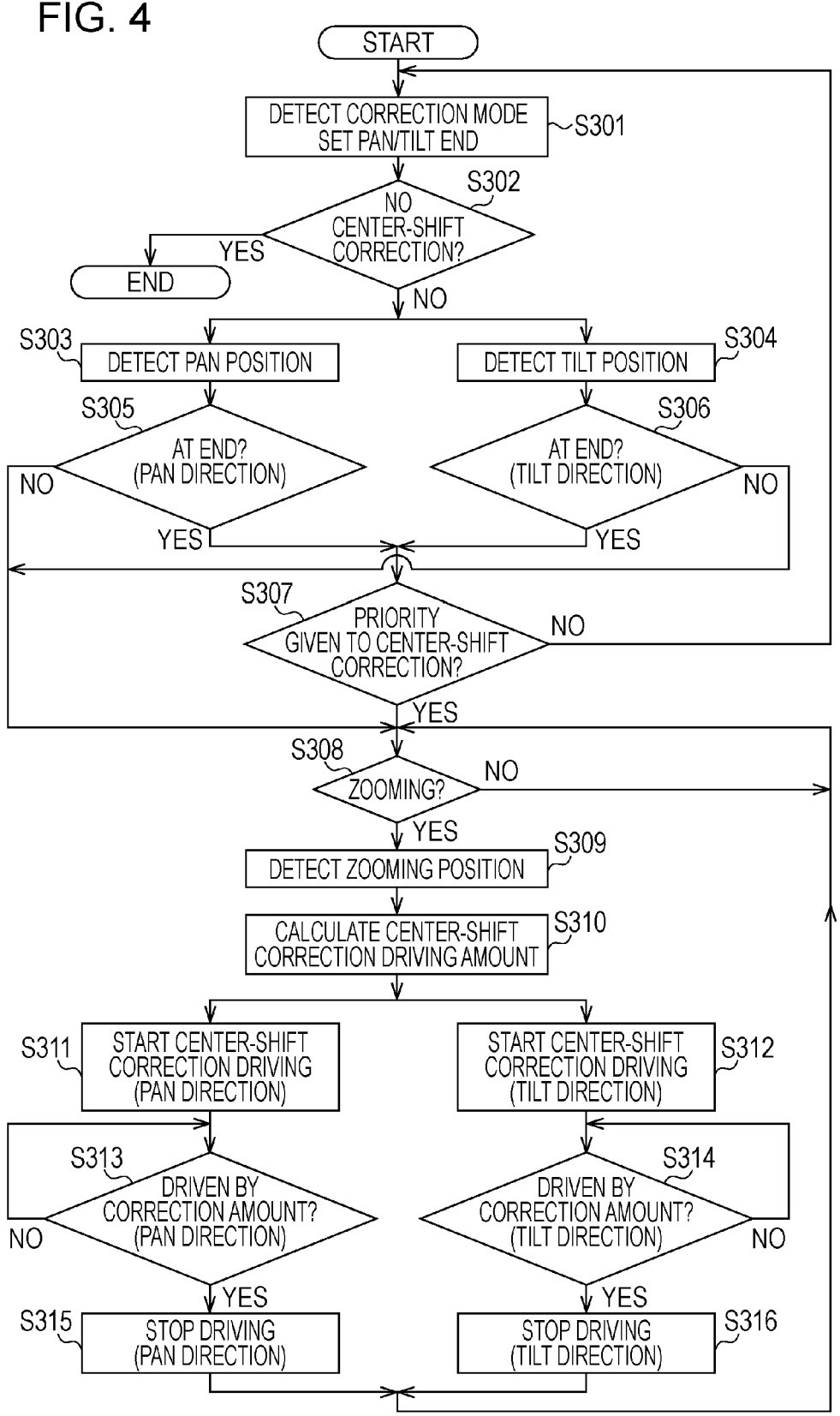
FIG. 4 is a flowchart showing an operation according to an embodiment of the present invention.

FIG. 4 is a flowchart when the center-shift correction is expected at the pan/tilt end.

(Step S301) The detection of the correction mode and the setting of the pan/tilt driving range, or the end position, are performed as shown in the flowchart in FIG. 3.

(Step S302) It is determined whether the center-shift correction is validated or invalidated. When the center-shift correction is not to be performed, the processing is ended. When the center-shift correction is to be performed, the process goes to subsequent steps S303 and S304.

(Step S303) A current pan position is detected. When a DC motor or the like is used for the driving, the pan position encoder 31 is used. When a pulse motor or the like is used, the position detection is performed by counting in the control CPU 21.

(Step S304) A current tilt position is detected. When a DC motor or the like is used for the driving, the tilt position encoder 32 is used. When a pulse motor or the like is used, the position detection is performed by counting in the control CPU 21.

(Step S305) It is determined whether the current pan position is at the end position or not on the basis of the pan position detected in step S303. When the pan position is not at the end position, the process goes to step S308 so as to perform the normal center-shift correction. The end position herein is set in step S301. When the center-shift correction priority mode is selected, the end position is set inside the actually movable pan driving range. When the pan/tilt priority mode is selected, the end position is at an end position of the actually movable pan driving range.

(Step S306) It is determined whether the current tilt position is at the end position or not on the basis of the tilt position detected in step S304. When the tilt position is not at the end position, the process goes to step S308 so as to perform the normal center-shift correction. The end position herein is set in step S301. When the center-shift correction priority mode is selected, the end position is set inside the actually movable tilt driving range. When the pan/tilt priority mode is selected, the end position is at an end position of the actually movable tilt driving range.

(Step S307) It is determined whether the mode is the center-shift correction priority mode or not. When the center-shift correction priority mode is selected, the process goes to step S308. When the center-shift correction priority mode is not selected, it is determined that the pan/tilt priority mode is selected, and then the process returns to step S301.

With this determination processing, in the center-shift correction priority mode, the center-shift correction can be performed at the pan/tilt end position provided inside the normal driving range, and in the pan/tilt priority mode, the pan/tilt driving can be performed to the available driving range. In the pan/tilt priority mode, the center-shift correction is not performed at the pan or tilt end position.

(Step S308) It is determined whether the zooming operation is being performed or not. When the zooming operation is not performed, subsequent processing is suspended. When the zooming operation is performed, the procedure goes to subsequent step S309 for the center-shift correction. The determination whether the zooming operation is performed or not may be made by an interruption function of the control CPU 21. Zooming is operated by the zooming operation unit 41 provided in the image pickup apparatus, or with a signal from the external device connected with the external connection unit 42.

(Step S309) The zooming position is detected. When the actuator 36 that drives the zoom lens unit 12 is a DC motor or the like, the zooming position has to be detected by the position encoder 39. When the actuator 36 is a pulse motor or the like, the position obtained by counting in the control CPU 21 may be used as the zooming position.

(Step S310) The previously stored center-shift correction information is read from the center-shift information storage portion 25, and the correction driving amount for the center-shift correction is calculated. The center-shift correction information may be an optical center-shift amount or merely a correction driving amount. The center-shift correction information is obtained through the design simulation or the measurement during the manufacturing process. The procedure continues at steps S311 and S312.

(Step S311) The pan actuator 28 which is a part of the pan/tilt unit 17 starts the driving thereof in the pan direction to perform the center-shift correction.

(Step S312) Similarly, the tilt actuator 30 starts the driving thereof in the tilt direction to perform the center-shift correction. Herein, an algorithm is employed in which the pan driving and the tilt driving are simultaneously performed. However, the pan driving and the tilt driving may be started alternately as described with reference to the flowchart in FIG. 2.

(Step S313) It is determined whether the driving in the pan direction by the center-shift correction driving amount is completed or not. When the driving amount is not sufficient, the driving in the pan direction is continued. When the driving is completed by the desired driving amount, the process goes to step S315.

(Step S314) It is determined whether the driving in the tilt direction by the center-shift correction driving amount is completed or not. When the driving amount is not sufficient, the driving in the tilt direction is continued. When the driving is completed by the desired driving amount, the process goes to step S316.

(Step S315) The driving in the pan direction is stopped. After the driving is stopped, the processing from step S308 is repeated.

(Step S316) The driving in the tilt direction is stopped. After the driving is stopped, the processing from step S308 is repeated. If the center-shift correction with the center-shift correction portion 22 is performed after the zooming operation is completed, a field angle is rapidly changed. As a result, a captured image may be unintentionally vibrated, or it may be difficult to perform zooming into an intentional field angle. Hence, it is desirable that the above-described processing is continuously performed during the zooming operation, in a manner similar to the flowchart in FIG. 2.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-270831 filed Oct. 18, 2007, which is hereby incorporated by reference herein in its entirety.

What is claimed is:

1. An optical apparatus comprising:
    a lens unit having a zoom lens for zooming and a focus lens for focusing;
    a zoom actuator for moving the zoom lens in an optical-axis direction;
    a focus actuator for moving the focus lens in the optical-axis direction;
    a unit configured to at least one of pan the lens unit and tilt the lens unit;
    a driving control unit configured to control driving of the unit;
    a position detection unit configured to detect a position of the zoom lens of the lens unit in the optical-axis direction;
    a storage portion configured to store information relating to a center shift of a captured image resulting from a position of the zoom lens; and a center-shift correction portion configured to determine a driving amount of the unit necessary for reducing the center shift at the position of the zoom lens detected by the position detection unit based on the detected position of the zoom lens and the information relating to the center shift stored in the storage portion, wherein the driving control unit controls driving of the unit based on the driving amount determined by the center-shift correction portion.

2. The optical apparatus according to claim 1, wherein the lens unit includes an image pickup element, and wherein the unit is a camera platform.

3. The optical apparatus according to claim 1, wherein the center-shift correction is performed during zooming by at least one of continuously panning and continuously tilting.

4. A monitoring camera system comprising:

a lens unit having a zoom lens for zooming and a focus lens for focusing;

a zoom actuator for moving the zoom lens in an optical-axis direction;

a focus actuator for moving the focus lens in the optical-axis direction;

a unit configured to at least one of pan the lens unit and tilt the lens unit;

a driving control unit configured to control driving of the unit;

a position detection unit configured to detect a position of the zoom lens of the lens unit in the optical-axis direction;

a storage portion configured to store information relating to a center shift of a captured image resulting from a position of the zoom lens; and a center-shift correction portion configured to determine a driving amount of the unit necessary for reducing the center shift at the position of the zoom lens detected by the position detection unit based on the detected position of the zoom lens and the information relating to the center shift stored in the storage portion, wherein the driving control unit controls driving of the unit based on the driving amount determined by the center-shift correction portion.

\* \* \* \* \*